Oct. 28, 1924.
M. W. KOSKI
1,513,400
FISHHOOK
Filed Nov. 16, 1922
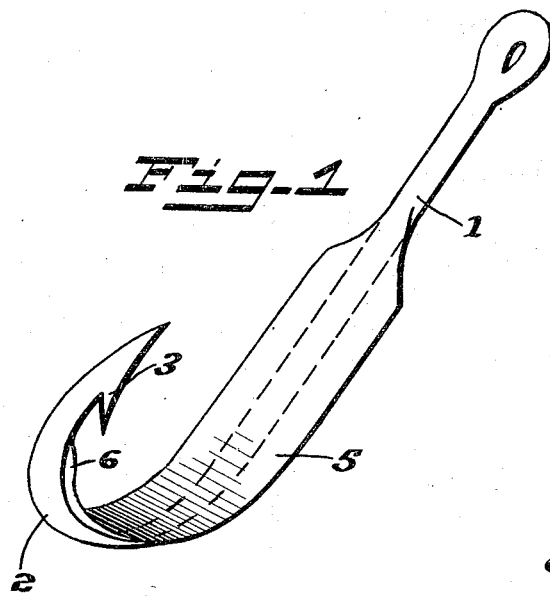
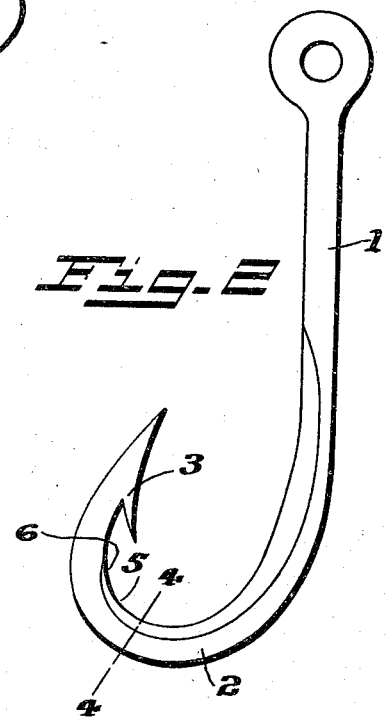
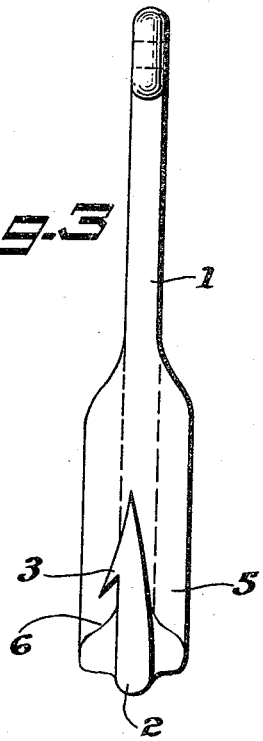
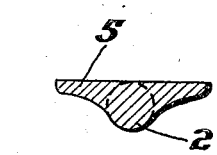
Inventor
MATT W<sup>M</sup>. KOSKI.
By H. L. & C. L. Reynolds
Attorneys Patented Oct. 28, 1924.

1,513,400

UNITED STATES PATENT OFFICE.

MATT WILLIAM KOSKI, OF COSMOPOLIS, WASHINGTON.

FISHHOOK.

Application filed November 16, 1922. Serial No. 601,288.

*To all whom it may concern:*

Be it known that I, MATT WILLIAM KOSKI, a citizen of the United States of America, and resident of the city of Cosmopolis, in Grays Harbor County, State of Washington, have invented certain new and useful Improvements in Fishhooks, of which the following is a specification.

My invention relates to a fish hook and has for its general object the prevention of tearing of the mouth tissues of the fish, to the end that the fish may not readily free itself from the hook, once the hook has entered the tissues of its mouth.

It is a further object to provide means which shall be inconspicuous and which may be covered with bait, and yet which may be effective for the purpose intended.

A further object is the provision of a hook which may be simply and cheaply constructed, yet including means for accomplishing my main object.

My invention comprises the novel parts of a fish hook and the novel arrangements thereof which are shown in the accompanying drawings, described in the specification, and particularly defined by the claims terminating the same.

In the accompanying drawings I have shown my invention in the form of construction which is now preferred by me.

Figure 1 is a perspective showing my hook.

Figure 2 is a side elevation, and Figure 3 a front elevation thereof.

Figure 4 is a section on line 4—4 of Figure 2.

It often happens that a fish will shake a hook from its mouth, or will tear out the hook by tearing the hook through the mouth tissues until it has emerged therefrom. In so doing the bend of the hook, which is of fine wire, acts as a knife to cut these mouth tissues, and does not resist this tearing action. By my invention means are provided for resisting this tearing, by interposing a broadened surface across the line of movement of the hook in being torn from the mouth.

The hook has the ordinary shank 1, the bend 2 and the barb 3. In these respects it is similar to any ordinary hook, or may be in any preferred form. These details are preferably left unchanged. However, from a point adjacent the barb 3 to some convenient point, preferably past the bend 2, the inner face of the hook is broadened to form flattened surface 5. This surface, which is at the inner side of the bend, lies in general transversely of the plane of the hook itself. At its end nearest the barb 3 it may converge into the bend, and preferably is sharpened, as indicated at 6. If desired, its edge may be sharpened the entire distance. This latter, however, is immaterial.

As the hook enters the tissues of the fish's mouth, the sharpened edge 6 cuts these tissues until a material portion of the surface 5 is embedded therein. Any pull caused by the fish trying to tear the hook from its mouth causes the broadened end flattened surface 5 to tend to spread the tissues and to cause them to resist the hook being torn therefrom. This places a broadened resistance over a considerable breadth in place of the ordinary rather sharp wire which forms the bend of an ordinary fish hook. By the use of my invention many fish will be landed which ordinarily would be lost by tearing the hook from their mouths.

What I claim as my invention is:

1. A fish hook having a bend broadened transversely of the general plane of the hook.

2. A fish hook having a shank, a bend, and a barb, and having a portion at the bend broader transversely than the barb.

3. A fish hook having a shank, a bend, and a barb, a portion of the bend being broadened to form a curved, flattened surface extending transversely of the plane of the hook.

4. A fish hook having a shank, a bend, and a barb, the hook having a broadened and flattened portion extending from the shank about the bend to a point adjacent the barb, the curved surface so formed extending about the inner side of the bend, and transversely of the plane of the hook.

5. A fish hook having a shank, a bend, and a barb, a portion of the bend being broadened to form a curved, flattened surface extending transversely of the plane of the hook, and said surface having a sharpened edge at its end towards the barb.

Signed at Cosmopolis, Grays Harbor County, Washington this 8th day of November, 1922.

MATT WILLIAM KOSKI,